United States Patent [19]

Blackburn et al.

[11] Patent Number: 5,694,729
[45] Date of Patent: Dec. 9, 1997

[54] WALL PARTITION CONNECTOR

[75] Inventors: David G. Blackburn, Long Beach; Steven P. Kettenburg, Mission Viejo; Andy J. Scherer, San Dimas; John E. Smith, Mission Viejo, all of Calif.

[73] Assignee: Panel Concepts, Inc., Santa Ana, Calif.

[21] Appl. No.: 307,364

[22] Filed: Sep. 16, 1994

[51] Int. Cl.$^6$ ........................................ E04B 2/78
[52] U.S. Cl. .................. 52/582.2; 52/36.1; 52/36.6; 52/126.4; 52/127.2; 52/239; 52/656.9; 52/712; 52/732.2; 52/732.3; 403/316; 403/340
[58] Field of Search .................. 52/582.2, 586.1, 52/656.9, 36.1, 36.5, 36.6, 239, 126.4, 127.1, 127.2, 732.2, 732.3, 733.4, 712, 713; 403/340, 316, 319, 320

[56] References Cited

U.S. PATENT DOCUMENTS

| | | | |
|---|---|---|---|
| 3,771,277 | 11/1973 | Rausch et al. | 52/586.1 X |
| 3,780,481 | 12/1973 | Tomkins | 52/586.1 X |
| 4,344,475 | 8/1982 | Frey . | |
| 4,417,430 | 11/1983 | Loikitz . | |
| 4,443,911 | 4/1984 | Bannister . | |
| 4,512,122 | 4/1985 | Berkowitz . | |
| 4,625,477 | 12/1986 | Johnstonbaugh . | |
| 4,852,317 | 8/1989 | Schiavello et al. . | |
| 4,918,879 | 4/1990 | Bodurow et al. . | |
| 4,924,649 | 5/1990 | Taylor | 52/656.9 |
| 4,989,386 | 2/1991 | Collis . | |
| 5,004,371 | 4/1991 | Sorensen . | |
| 5,024,030 | 6/1991 | Morrison | 52/36.1 |
| 5,054,255 | 10/1991 | Maninfior . | |
| 5,092,385 | 3/1992 | Beaulieu . | |
| 5,117,599 | 6/1992 | Voss . | |
| 5,155,960 | 10/1992 | Shaanan . | |
| 5,272,850 | 12/1993 | Mysliwiec et al. | 52/582.2 |
| 5,313,751 | 5/1994 | Witler . | |
| 5,325,649 | 7/1994 | Kajiwara | 403/340 X |

FOREIGN PATENT DOCUMENTS

1272729  5/1972  United Kingdom .

*Primary Examiner*—Christopher T. Kent
*Attorney, Agent, or Firm*—Knobbe, Martens, Olson & Bear, LLP

[57] ABSTRACT

A connector system for demountable wall modules, including a pair of adjoining vertical channel members having mating structure. The channel members are cut from the same extrusion, and one member is inverted with respect to the other. The mating structure which that provides includes an outwardly extending flange having a mating protrusion, a central wall, and a U-shaped rail having a mating cavity. The mating protrusion on one channel member is positioned to fit within the mating cavity of the other channel member, and vice versa. The central walls are slightly offset from a central plane of the panels to lie in an overlapped relationship. One or more locking keys are inserted through slots in the extending flanges to bias the flange away from the central wall of the opposed channel member. In this manner, the mating protrusions are held within the mating cavities to securely fasten the two panels together. The panels may be aligned to form a straight wall or may be disposed at various angles with the use of a separate connector member having mating structures similar to those on the channel members. The slots in the extending flanges are visible through gaps between the panels for inserting the locking keys. Shelving brackets or other such structure may also be mounted in channel slots or may replace the locking keys in the slots to join the panels.

36 Claims, 6 Drawing Sheets

WALL PARTITION CONNECTOR

FIELD OF THE INVENTION

The invention is generally related to a demountable panel connector system and, more particularly, to an improved connector for wall panels and the like.

BACKGROUND OF THE INVENTION

It is common practice in office furniture systems to use freestanding demountable wall panels to subdivide a relatively large interior space into separate workstations. Generally, partitions for offices and the like are formed of prefabricated panels and are erected on site. Previous demountable partitions have been expensive to install due to the relatively high cost of materials and labor. Conventional demountable partitions are constructed of solid or fabric panels with edging of wood or metal, usually steel or extruded aluminum, which are screwed or bolted together.

In one previous demountable panel system disclosed in U.S. Pat. No. 4,852,317 to Schiavello, et al., extruded channels on the panel edges connect to separate clip rails which lock together upon transverse relative motion. Thus, at each junction between panels there are two edge extrusions and two extruded clip rails. This system requires a fair amount of extruded aluminum at each panel junction, and furthermore, the panels can be separated by a moderate transverse separating force. A specialized bracket is inserted in a recess between the clip rails and wedged therein utilizing a threaded screw in order to provide a support for workstation equipment.

U.S. Pat. No. 5,117,599 issued to Voss discloses a panel connector arrangement which includes a pair of adjacent extruded connectors which are joined together utilizing a discrete seating hook extending through opposed slots in the extrusions and a clamping device that is screw actuated. Again, the arrangement for attaching the two extruded channels together is relatively cumbersome and time consuming, given the necessity for screw-actuating the clamp device.

Another problem with installing such temporary wall partitions in offices is aligning the partitions to have parallel upper edges. Often the wall partitions are situated on uneven flooring or may be manufactured in odd lots. This leads to uneven heights, which is aesthetically undesirable. Most existing wall-partition systems provide adjustable feet, or glides, for raising the height of one of the partitions relative to the other during installation to even out their upper edges. However, this installation procedure may require two workers and is relatively time consuming, especially for very large interior spaces.

Given the drawbacks associated with wall-partition systems of the prior art, there is a need for a simpler, easier-to-install wall-partition connector system. Furthermore, there is a need for an expedited procedure for leveling the tops of the wall partitions during installation, which reduces labor costs.

SUMMARY OF THE INVENTION

In one aspect, the present invention provides a demountable panel system comprising a pair of wall panels having channel like connector members positioned on adjacent vertical edges. Each of the channel members includes a pair of spaced outer walls joined by a web extending perpendicular to the outer walls. A panel abutment wall extends across the outer walls and generally parallel to and rearward from the web. The abutment wall is joined to the outer walls at a location spaced from their rear ends so that a panel receiving cavity is formed and the vertical edge of each of the adjacent panels is positioned in this cavity. Each of the channel members further includes a flange and a rail extending forwardly from the web and spaced from each other. One of the channel members is inverted with respect to the other channel member so that the panels can be moved into edge to edge locking engagement with the flange of each channel engaging the rail of the other. Complimentary mating structure on the flanges and rails is aligned when the channels are brought together. A gap is formed between the outer walls on at least one side of the engaged channel members when the panels are brought together. A locking element is positioned between the flanges to hold the channel members in an interengaging relation. The locking element is inserted through the gap in a direction generally parallel to the web, and is removable from between the flanges through the gap to enable the wall panels to be demounted.

In a further aspect of the present invention, an edge connector is provided to be attached to an edge of a first element and to be connected to a mating connector attached to an edge of a second element. The edge connector includes a long planer web, a flange joined to the web and extending forwardly from one side thereof, and a rail joined to the web spaced from the flange and extending forwardly from the same side as the flange. One of the flange and the rail has a protrusion extending from the flange in a first direction generally parallel to the web, and the other has a cavity which is complementary to the protrusion and open toward the first direction. The edge connector mates with an inverted mating connector with a similar cross-section such that the flange of the edge connector engages the rail of the mating connector, and vis-a-versa. The protrusion on the mating connector extends in a second direction opposite the first direction and the cavity on the mating connector opens toward the second direction, such that the protrusion on the edge connector will fit within the cavity of the mating connector and the protrusion on the mating connector will fit within the cavity of the edge connector by moving the edge connector toward the mating connector and then moving the entire edge connector in the first direction with respect to the mating connector. Upon engagement of the flanges and rails, the protrusion and mating cavity pairs prevent movement of the edge connector away from the mating connector, while permitting movement of the entire edge connector in the second direction with respect to the mating connector, thus permitting decoupling of the connectors. Further, the connectors are capable of being locked together upon the positioning of structure between the connectors that prevents movement of the entire edge connector in the second direction with respect to the mating connector and holds the protrusions in the cavities.

Preferably the edge connector or channel member is formed as an extrusion including a portion having a modified E-shaped cross-section with a substantially planer web forming the vertical portion of the E-shape, a flange extending away from the web in a forward direction forming the lower arm of the E-shape, and a shorter rail spaced forming the upper arm of the E-shape. A wall between the flange and the rail forms the middle arm of the E-shape. The flange includes a plurality of spaced slots adapted to receive a locking element which provides a force between a flange of one extrusion length and the wall of the other extrusion so as to hold the mating structure in the mating position. The extrusion may also comprise outer walls including portions extending forwardly from the web that are spaced from the rail and the flange on either side to define a pair of fabric receiving recesses, the fabric being stretched over the planer elements to which the channel like extrusions are attached.

DESCRIPTION OF THE PREFERRED EMBODIMENTS

Figure 1:
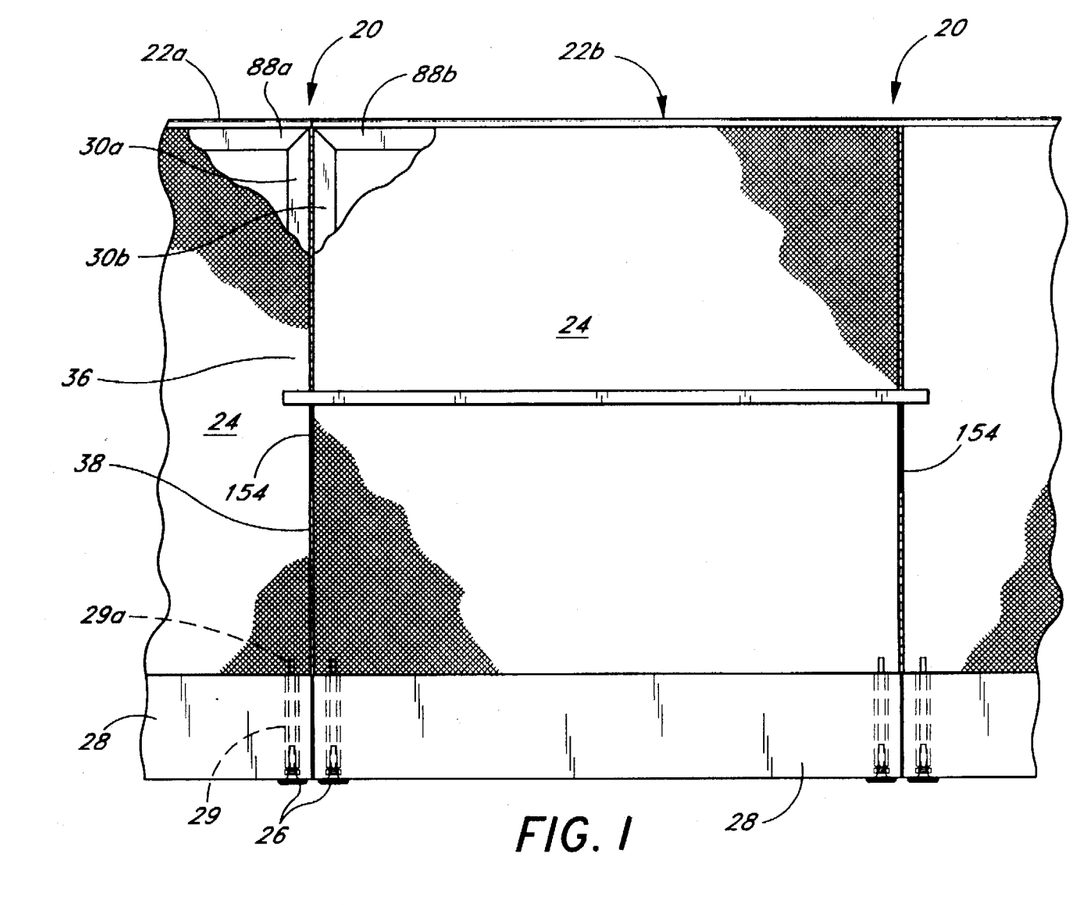
FIG. 1 is a front elevational view of a pair of connected wall partitions utilizing an improved connector system of the present invention.

Now with reference to FIG. 1, a preferred connector system 20 of the present invention is shown joining two wall partitions or panels 22a, 22b aligned in a common plane and having adjacent vertical edges. The panels 22a,b may take a variety of forms, but are typically configured as a rectangular frame (not shown) having fabric 24 pulled taut thereover. Each panel 22 may rest directly on the ground, utilizing two or more glides 26, or height-adjustable feet. In the present embodiment, each of the panels 22 is mated over the top of a hollow skirt portion 28 within which a load-bearing column or stand-off 29 is provided for rigidly attaching to the lower edge of the panels and to the glides 26. Electrical and other wires and outlets are placed within the skirt portion 28. In the most commonly used configuration, the panels 22a,b have a height of 42 to 72 inches. A plurality of panels 22 are typically joined together at their side edges to divide a larger space into smaller work areas, such as office cubicles.

The fabric 24 has been cut away at the upper portion of the connector system 20 to expose a pair of vertical channel members 30a, 30b. These channel members 30a,b comprise elongated extrusions, preferably of aluminum or steel, although other materials and fabrication methods may be substituted. In accordance with the invention, these channel members 30a,b have identical cross-sections having been formed from the same extrusion die, and conveniently cut to the desired length. This reduces the manufacturing costs associated with purchasing and utilizing multiple dies and also simplifies the assembly as only one shape of member 30 is used for both left and right sides of each panels 22. The channel members 30 are provided on both sides of the panels 22 and include novel mating structure for joining panels as will be described below with specific reference to FIGS. 2–4. In this discussion, from the perspective of one channel member, e.g. member 30a, the direction toward the opposite channel member 30b will be referred to as "forward," while the direction toward the associated panel 22a will be denoted "rearward."

Structure of Channel Members

Figure 2:
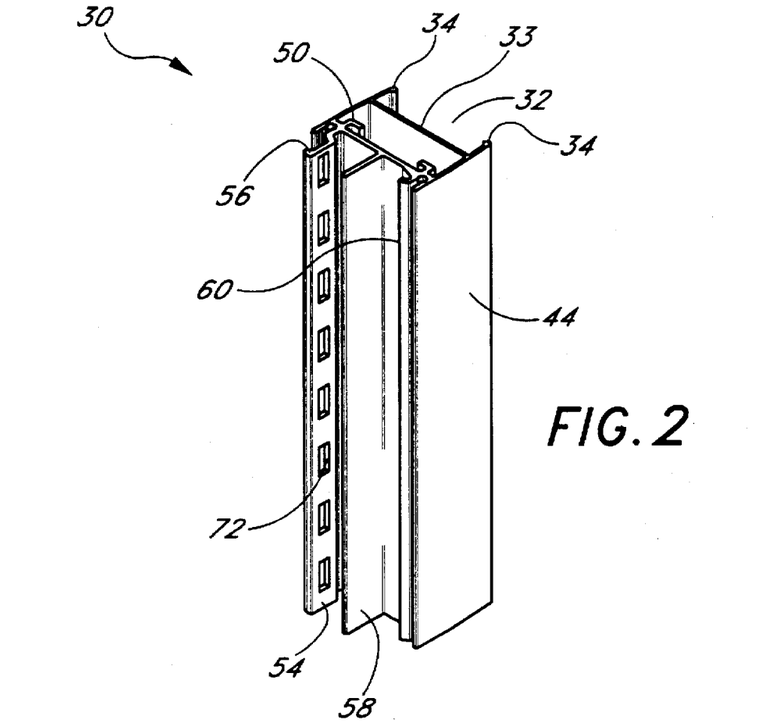
FIG. 2 is a perspective view of a channel member forming a part of the connector system of the present invention.
Figure 3:
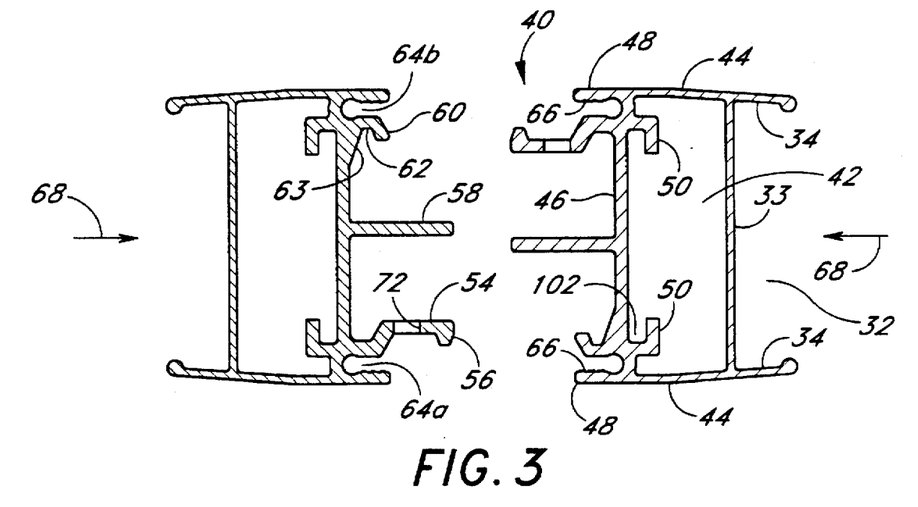
FIG. 3 is a cross-sectional view of two opposed channel members prior to coupling.
Figure 4:
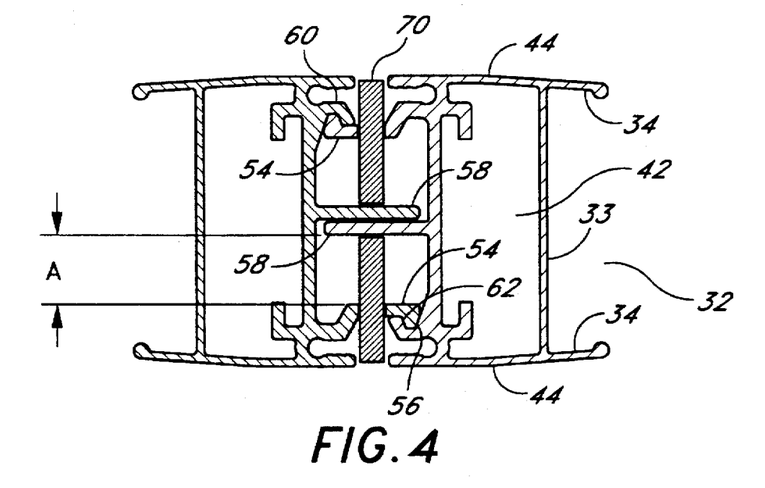
FIG. 4 is a cross-sectional view of the two channel members after coupling and installation of locking keys or cams.

As seen in FIGS. 2–4, the channel members 30a,b each have a panel-receiving cavity 32 formed between a panel abutment wall 33 and a pair of generally parallel rearward wall extensions 34. The channel members 30a,b can thus be forced onto the frame edges of the panels 22a,b and frictionally held thereon due to the slightly inwardly directed shape of the wall extensions 34. The extensions 34 tend to separate slightly to grip the panels 22. If desired, the members 30 can be more securely connected to the panels 22 via fasteners or adhesive. Each panel 22a,b includes a border portion 36 of fabric which extends over the exterior of the wall extensions 34 to nearly completely hide the channel members 30a,b while leaving a small gap 38 therebetween. This cosmetic detail can be seen in FIG. 1. The connector system 20 is thus hidden from view while the gap 38 allows the disassembly of the system, as well as the installation of a separate shelving system, as will be more fully described below. The panels 22 also have horizontal channel members 88a, 88b at the top and bottom edges similarly covered by border portions 36 of the fabric.

Figure 7:
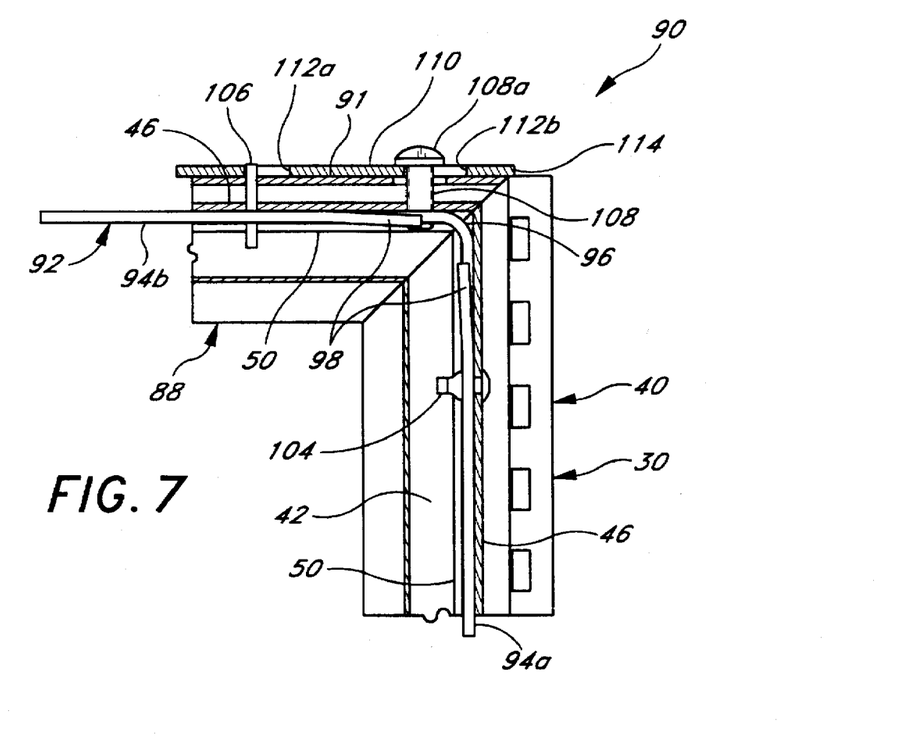
FIG. 7 is a cross-sectional view of an upper corner connection between the wall partitions.

Each elongated channel member 30 is a rigid, structural member defining a generally rectangular inner space 42 formed between the panel abutment wall 33, a pair of parallel outer walls 44, and a web 46 disposed parallel to the panel abutment wall. Each of the outer walls 44 includes the aforementioned wall extensions 34 and a fabric-gripping rail 48 perpendicular to, and extending forwardly from, the web 46. Within the inner space 42 are a pair of aligned corner-plate flanges 50 sized to couple with corner plates 92, as shown in FIG. 7. The specific function and structure of the corner plates 92 of the present invention will be described in more detail below.

Each member 30a,b includes a mating structure 40 formed on a front face of the web 46. The mating structure 40 is designed to couple with identical mating structure on the opposing channel member. In order to couple two channel members 30 together, one is inverted with respect to the other so that the respective mating structures 40 have interlocking portions. This inverted coupling will become clearer below.

The mating structure 40 forms somewhat of an "E" shaped cross-section with three generally horizontal legs extending forwardly from the vertical web 46. Looking at the left channel member 30a in FIG. 3, a flange 54 defines a bottom leg of the E. The flange 54 is positioned slightly inward from the lower fabric-gripping rail 48 and extends in a forward direction parallel to the rail. At about the forwardmost extension of the adjacent rail 48, a small inward jog in the flange 54 leads to a straight forwardly directed portion having an outwardly directed mating protrusion 56 on its terminal end. The middle leg of the E is defined by a straight light and sound barrier wall 58 extending forwardly from the web 46 approximately the same distance as the flange 54. The wall 58 is slightly offset from a midpoint of the web 46 away from the flange 54. Finally, an upper shortened leg of the E comprises an inverted generally V- or U-shaped rail 60 having an inwardly formed mating cavity 62. The rail 60 projects forward from a thickened region of the web 46 so that an angled surface 63 defines a rear boundary of the cavity 62. The rail 60 extends forward from the web 46 approximately to the end of the upper fabric-gripping rail 48.

A thin, elongated recess 64a is formed between the lower fabric-gripping rail 48 and the initial forwardly extending portion of the flange 54. Likewise, a thin, elongated recess 64a is formed between the upper fabric-gripping rail 48 and the outer surface of the U-shaped rail 60. Each recess 64a,b receives the fabric border portion 36 previously mentioned. A series of serrations 66 on an inner wall of the recess 64 provides a gripping means to hold the fabric border portion 36 with a common screen extrusion, when it is bunched therein. This step of assembly is preferably done at the point of manufacture of the panels 22 rather than during installation of a plurality of panels to form a divided office space.

Coupling of Channel Members

FIG. 3 illustrates two adjacent channel members 30a,b being brought together in the direction of arrows 68. As was mentioned above, the second channel member 30b is inverted with respect to the first member 30a. The second channel member 30b has mating structure 40 identical to but in a reverse E configuration with the flange 54 on top and the rail 60 on the bottom. Thus, the flange 54 of one channel member, e.g. 30a, couples with the U-shaped rail 60 of the other member 30b, and visa versa. Although the two channel members 30a,b are illustrated with the outer walls 44 in alignment, the members are actually slightly offset when being coupled to allow the respective mating protrusions 56 to clear the U-shaped rails 60. In the orientation shown in FIG. 3, the left-hand member 30a will be raised slightly during coupling to the right member 30b.

The final coupled structure is shown in FIG. 4. The projection 56 of each flange 54 fits snugly within the cavity of the opposite channel member 30. In this respect, the cross-sectional shape of the protrusion 56 is identical to that of the cavity 62 in order to eliminate looseness therebetween in a final coupled state. It will now be apparent that the slight jog in each flange 54 provides one wall for a recess 64 as well as positions the terminal end of the flange inwardly so the protrusion 56 can be placed in registry with the cavity 62 of the opposite channel member 30. The slight offsetting of the central walls 58 from an exact centerline creates a closely spaced overlapped structure with the terminal ends of the central walls nearly reaching the opposite web 46. The surface of each central wall 58 directed outward from the overlapped structure faces the inner surface of the extending flange 54 on the opposed channel member 30. The gap between each of the central walls 58 and the opposed extending flange 54 is denoted by the distance A in FIG. 4. In order to lock the channel members 30a,b together, one or more locking keys or cams 70 are inserted through slots 72 passing transversely through the extending flange 54. FIG. 4 illustrates the small spacing left between the opposing outer walls 44 to form the gap 38 for passage of the keys 70.

Locking Key Structure

Figure 5:
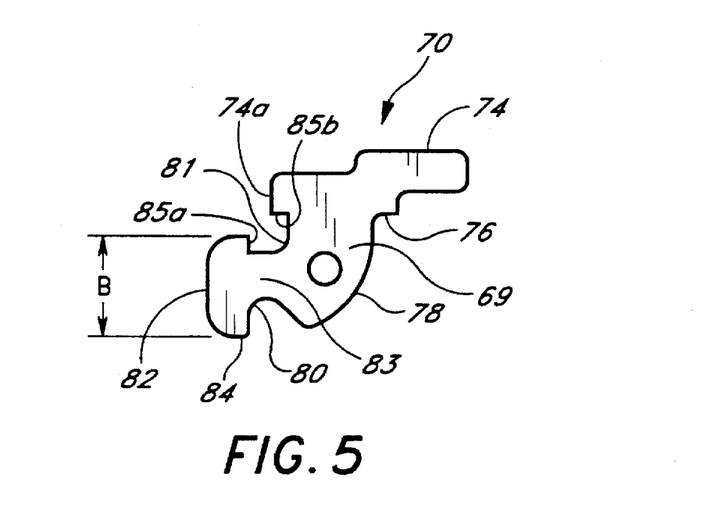
FIG. 5 is a side elevational view of a preferred locking key used for securing the channel members.
Figure 6:
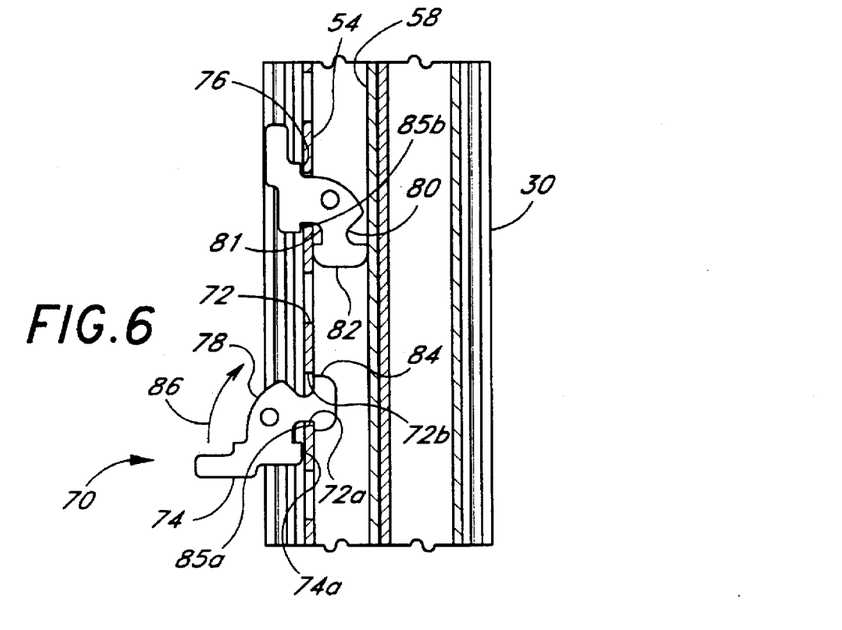
FIG. 6 is a partial sectional elevational view of the connector system showing the placement and installation of the locking key.

FIG. 5 illustrates the unusual profile of the locking key 70, while FIG. 6 shows the locking key as inserted into the connector system 20. The locking key 70 has an unconventional shape configured to insert through one of the slots 72 of the extending flange 54 and then be repositioned to bias the flange away from the opposed central wall 58. To accomplish this function, the locking key 70 includes a number of contact surfaces and protrusions which together define an ingenious device for simply locking the channel members 30a,b together without the use of tools or with only a hammer for light tapping. It should be understood that although the specific shape of the key 70 is described in great detail herein, other shapes providing similar benefits may be utilized.

As seen in elevation in FIG. 5, the locking key or cam 70 has an outer peripheral shape somewhat in the shape of a pistol. In this analogy, a central, wide curvilinear body 69 forms the handgrip of the pistol and a forwardly extending installation lever 74 defines the barrel. A spacer shoulder 76 is formed at the base of the installation lever 74 and adjacent an convex insertion surface 78 on a first side of the body 69. The surface 78 transitions to an arcuate recess or slot relief 80 at the lower end of the body 69. A second side of the body 69 having concave curvature similar to the insertion surface 78 defines a slot receptacle 81. The slot relief 80 and slot receptacle 81 form a narrow neck 83 between the body 69 and a cam member 82 having a nose The cam member 82 is longer than it is wide, with the long side wider than the neck 83 and aligned generally perpendicular to the forwardly extending installation lever 74. The key 70 is relatively thin with respect to its elevation, as seen in FIG. 4, and thus is formed as a plate-like element. One or more holes (not numbered) are provided in the body 69 for insertion of a painting apparatus support rod.

The cam member 82 has a length B which is slightly greater than the distance A between each extending flange 54 and central wall 58 of the channel member 30 of FIG. 4. The length B is also greater than the length of the slots 72 in the channel member 30, but the width of the cam member is smaller than the length of the slots. Additionally, the key neck 83 is smaller across than the length of the slots 72. The cam member 82 extends past the slot receptacle 81 to form a stop 85a. A ledge 85b is formed by a rearward projection 74a of the lever 74. The functions of the cam member 82 and stop 85a during installation of the key 70 will be explained below.

Installation of Locking Key

As seen in the lower portion of FIG. 6, the cam member 82 is first inserted through one of the slots 72 utilizing the slot relief 80 and slot receptacle 81. More specifically, the nose 84 is inserted into the slot 72 and the cam member 82 is advanced at an angle using the slot relief 80 until the cam member clears the flange 54 on a lower edge 72a of the slot (lower being arbitrarily assigned based on the orientation of FIG. 6). The rearward projection 74a limits the advance of the key 70 into the slot 72. At this point, the key 70 can be translated to position the lower edge 72a within the slot receptacle 81 and adjacent the stop 85a, as shown. The locking key 70 can then be rotated in the direction of arrow 86 so that the arcuate insertion surface 78 slides past the upper edge 72b of the slot 72 while the lower edge 72a provides a pivot for the slot receptacle 81. The locking key 70 is fully inserted when the spacer shoulder 76 contacts the flange 54 at the upper edge 72b of the slot 72, as shown in the upper portion of FIG. 6. In this position, the ledge 85b lies adjacent the lower edge 72a of the slot 72. It will be apparent that the specific shape of the slot receptacle 81 allows the locking key 70 to be pivoted and translated about the lower edge 72a of the slot 72. In other words, the slot receptacle 81, whose boundaries are defined by the stop 85a and ledge 85b, accommodates the thickness of the flange 54 when the key 70 is pivoted thereabout.

When the key 70 is fully inserted, the long dimension of the cam member 82 is forced between the extending flange 54 and opposed central wall 58 to lock the channel members 30a,b together. More specifically, by virtue of the cam member 82 having a dimension B slightly larger than the dimension A between each facing flange 54 and central wall 58, the wall is pushed toward the juxtaposed wall 58 of the opposed channel member 30, while the flange is pushed outward. The reaction force applied by the rigid central wall 58 will cause the cam member 82 to positively bias the flange 54 outward so that the projection 56 is held within the cavity 62.

Referring back to FIG. 4, and as stated above, the cam member 82 provides a force holding each mating protrusion 56 into the associated mating cavity 62 of the opposed channel member 30. Once coupled, the channel members 30a,b cannot be pulled directly apart due to the interfering structure of the mating protrusion 56 and U-shaped rail 60. In an alternative configuration, threaded fasteners may be inserted through threaded holes in the flanges 54 and advanced to contact the central walls 58 and provide the outward force on the flanges along a line perpendicular to the direction in which the channel members 30a,b are coupled. In other versions, the light trap central walls 58 may be eliminated altogether, although their overlapping relationship is preferred to facilitate an easy height adjustment explained below, and to provide a barrier for light and sound.

In a divergence from prior wall-partition connectors, the locking key 70 applies a force perpendicular to the direction in which the channel members 30a,b are brought together. This arrangement allows for the easy installation of the locking key 70 from the side of the connector system 20. It is desirable that at least two locking keys 70 be inserted through slots at lower and upper locations on either side of the connector system 20. Thus, the slots 72 are provided the entire length of the extending flanges 54. Of course, as few as one and more than two locking keys 70 may be utilized on either side. The remaining slots 72 are available for attaching other structures, such as shelving brackets, as will be described with reference to FIG. 10.

As seen in FIG. 6, the spacer shoulder 76 provides a small space between the lever 74 and the adjacent extending flange 54. In order to remove the locking key 70 from its inserted position in a slot 72, one need only slide a thin tool, such as a screwdriver tip, underneath the lever 74 in the space provided by the shoulder 76 in order to pivot the locking key in a direction opposite to the arrow 86.

Corner Connector System

The present invention also provides an improved system for connecting the vertical channel members 30a,b to horizontal channel members 88a,b at the top and bottom corners. With reference now to FIG. 7, an upper corner connector system 90 is shown. Each corner connector system 90 comprises the aforementioned vertical channel member 30, a horizontal member 88, a corner bracket 92, and a plurality of fasteners connecting the corner bracket 92 to the respective members. The horizontal members 88 are attached to the panels 22 in the same manner as the vertical members 30, but have a flat surface 91 in place of the mating structure 40. The corner brackets 92 each include a pair of perpendicularly disposed legs 94a, 94b having a predetermined width and joined at a corner bend 96 whose width is slightly less than the legs. The width of the corner bracket 92 transitions from the legs 94a, 94b to the corner bend 96 at a plurality of bent wings 98.

With reference back to FIGS. 2–4, each channel member 30 includes a pair of corner bracket flanges 50 extending rearwardly from the web 46 into the inner space 42. The flanges 50 extend rearwardly and then turn at 90-degree angles to face each other and form a planar channel 102 for receiving the corner bracket legs 94. The width of the channels 102 is slightly greater than the width of the legs 94. Thus, a vertical leg 94a of each corner bracket 92 is inserted downward into the channel 102 of the vertical channel member 30. The bent wings 98 are slightly offset out of the plane of the legs 94, as seen in FIG. 7, to define a locking structure for the corner bracket 92 within the planar channel 102. In other words, as the downwardly extending leg 94a is pressed into the channel 102, the bent wings 98 are wedged therein, eliminating looseness and preventing easy removal. In a like manner, the horizontally extending leg 94b is pressed into the planar channel 102 formed by the corner bracket flanges 50 in the horizontal channel member 88a. The bent wings 98 prevent easy removal and eliminate looseness between the corner bracket 92 and the horizontal channel member 88a. Both the vertical channel member 30a and the horizontal channel member 88a are cut at 45-degree angles to join together at the corner connector 90 without forming a gap. The corner bracket legs 94 are inserted into the respective perpendicularly disposed planar channels 102 so that the corner bend 96 lies along the 45-degree joint line between the members 30a and 88a.

Figure 8:
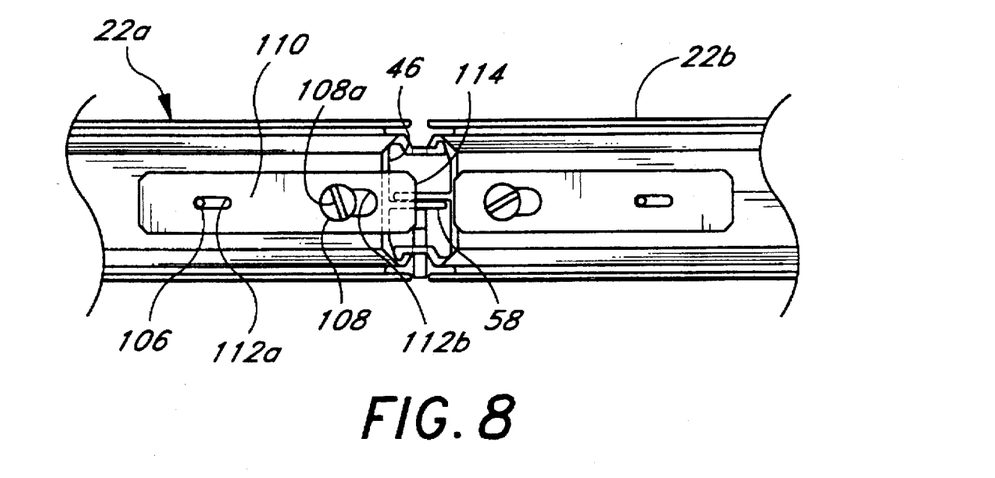
FIG. 8 is a partial sectional plan view of the upper corner connection illustrating a pair of leveling bars.

With reference now to FIGS. 7 and 8, the corner bracket 92 is rigidly fastened to the respective members 30a and 88a with the use of various fasteners. More specifically, the vertical leg 94a of the corner bracket 92 is fastened to the vertical member 30a with the use of at least one blind rivet 104. The rivet extends through the web 46 and through preformed holes in the corner bracket leg The tail end of the installed rivet 104 is in the inner space 42. Along the horizontal member 30a, the corner bracket 92 is fastened by the use of a pin 106 and a bolt 108. Both the pin 106 and bolt 108 extend downward through apertures in a leveling plate 110, through the flat upper surface 91, through preformed apertures in the corner bracket 92 and through the web 46. The bolt 108 has a threaded shaft that mates with internal threads on a preformed aperture in either the corner bracket 92 or web 46. Advantageously, the aperture through the corner bracket 92 is also positioned in a lower corner connector system to receive an upwardly directed stud 29a, FIG. 1, of the load-bearing column 29. The pin 106 is preferably friction fit into the holes through the flat upper surface 91, corner bracket 92 and web The leveling plate 110 comprises a generally rectangular bar having a pair of elongated apertures 112a, 112b. The aperture 112a is sized to allow sliding movement of the upwardly extending head of the pin 106 therein. The aperture 112b is sized to allow sliding movement of the shaft of the bolt 108. The bolt 108 preferably has a quick-release head, such as at 108a. By loosening the bolt 108, the leveling plate 110 may be slid longitudinally along the horizontal flat upper surface 91. A forward end 114 of the leveling plate 110 may be positioned from approximately the web 46 to a position short of midway along the central wall 58 of the vertical channel member 30 mated with the particular horizontal member 88. FIG. 8 shows the leveling plate 110 in a forwardly extended position, which allows the forward end 114 to overlap the central wall 58 extending from the opposite vertical channel member 30b.

With reference to both FIG. 1 and FIG. 8, the use of the leveling plates 110 will be described. Upon coupling of two panels of the same height 22a and 22b an uneven floor may induce the panels to follow a like contour. The leveling plates 110 are extended forwardly. The forward end 114 of the leveling plate thus extends into an interfering position with respect to the central wall 58 of the opposed vertical channel member 30. Likewise, the forward end 114 of the opposed leveling plate thus extends into an interfering position with respect to the central wall 58 of the former channel member 30. These interferences force the two panels 22a and 22b to remain at a level horizontal plane with respect to one another. At this point, the glide 25 on the panel which may have been raised to compensate for unevenness in the floor may be lowered into contact with the ground. In this manner the upper edges of the panels 22a, b can be rapidly and easily leveled. Leveling plate 114 will be retracted in a rearward direction of the shorter of two panels 22a and 22b in the event the two panels 22a and 22b are of differing heights. Retraction of leveling plate 114 on the shorter of two panels 22a and 22b will preclude interference between 114 and central wall 58 of the opposed vertical channel member 30.

Alternative Panel Configurations

Figure 9:
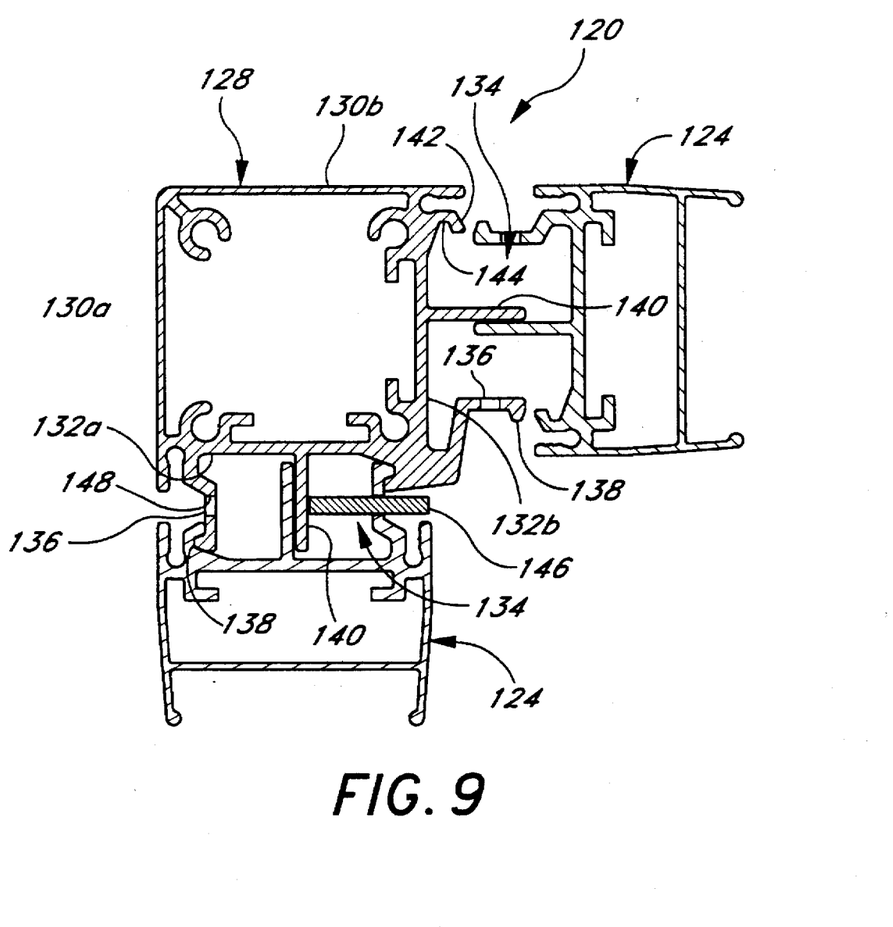
FIG. 9 is a cross-sectional view through a connector system joining two perpendicularly disposed wall partitions.

Although the particular connector system 20 that has been described above can only be utilized with coplanar panels 22a,b, an alternative connector system 120 is shown in FIG. 9 for joining a pair of perpendicularly disposed panels (not shown). Each of the panels has a vertical channel member 124 associated therewith. The vertical members 124 are identical to the previously described vertical members 30 and, specifically, include mating structure 126, identical to the mating structure 40. In order to couple the perpendicular panels 122, a separate corner coupling member 128 is provided. The coupling member 128 comprises a vertical post having an approximately rectangular cross section. Two outer surfaces 130a, 130b of the coupling member 128 are smoothly configured and may be fabric covered. These two surfaces 130a,b are adjoining and form exterior surfaces of the corner connector system 120. The remaining two sides 132a, 132b provide mating structure 134 for coupling to the mating structures 126 of the vertical members 124. The mating structure 134 includes at least an extending flange 136 having a mating protrusion 138, an approximately central wall 140, and a U-shaped rail 142 having a mating cavity 144. As before, a plurality of locking keys (not shown) are inserted through slots 148 in each of the two extending flanges 136 on the coupling member 128. Furthermore, locking keys (one shown at 146) will be inserted through the slots 72 in each of the extending flanges 54 on the vertical channel members 30. In this manner, the panels are securely fastened to the coupling member 128 and, in turn, to each other in a perpendicular orientation. The corner member may also be provided with a leveling plate.

There are numerous other configurations for the coupling member 128. In one embodiment, a T-connection can be provided with a coupling member 128 having a single flat, exterior surface and three sides having mating structure. Furthermore, a four-way coupling member may be provided with mating structure on all four sides to connect four panels together. In a further variation, the coupling member may be formed in a generally triangular configuration to allow for the coupling of three panels disposed at 120-degree angles to each other. As one of skill in the art can readily ascertain, there are a multitude of arrangements for connecting adjacent panel edges together utilizing a separate coupling member such as coupling member 128.

Accessories for the Panel Connector System

Figure 10:
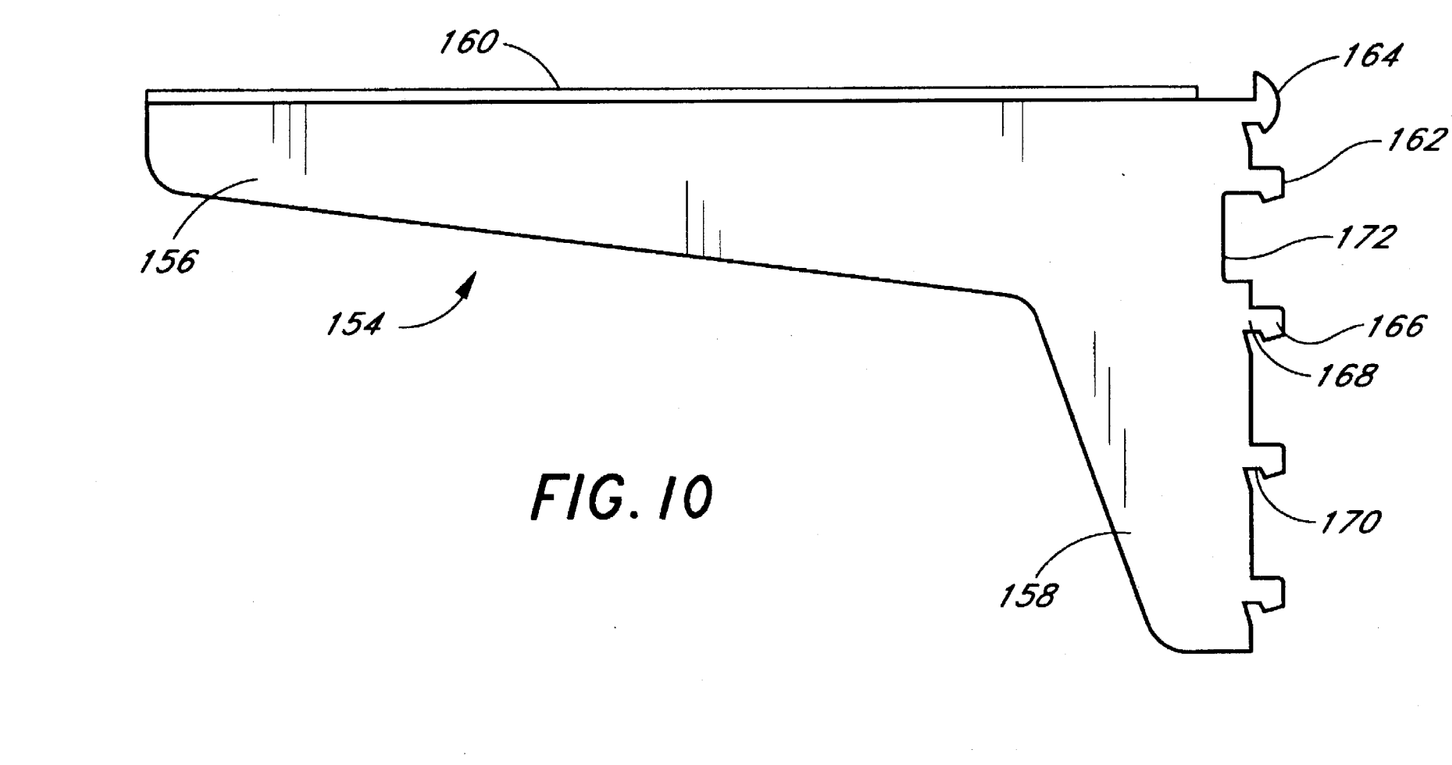
FIG. 10 is a side elevational view of a preferred shelf bracket for use with the connector system of the present invention.

Now with reference to FIG. 10, a preferred bracket 154 is shown for supporting a shelf or component. The bracket has the familiar horizontally extending ledge portion 156 and an angled support brace 158. The ledge portion 156 may also provide a horizontal platform 160 having apertures therethrough for fasteners to attach a shelf or component. On the inner end of the bracket 154, a thin, vertical region includes a plurality of catch members 162 and an arcuate locking member 164. The catch members 162 are identical and spaced apart the same distance as the slots 72 in the extending flanges 54 of the vertical channel members 30. Of course, the catch members 130 might also be inserted into the slots 148 in the extending flanges 136 of the alternative coupling member 128.

Each catch member is provided with a head portion 166 and a neck portion 168. An angled slot-receiving cavity 170 in each catch member 162, as well as below the locking member 164, provides guide surfaces for the upper edges of each of the slots 72 or 148 to force the head portions 166 inward. In a similar manner as the cam member 82 of the locking key 70, each of the head portions 166 and the locking member 164 provides structure between the extending flanges 54 or 136 and a central wall 58 or 140 in order to securely couple the horizontal members 30 together or to the coupling member 128. Indeed, the bracket 154 may be inserted in place of a locking key 70 to connect two panels 22 together. This is also a safety feature in that the bracket design makes it impossible to mount components on a panel without having it properly locked to an adjacent panel or panel connector. In the illustrated embodiment, the bracket 154 is provided with a recess 172 for receiving a locking key 70, previously installed. This ensures the secure coupling of the members 30a,b in the event the bracket 154 is removed. Furthermore, other such brackets for attaching various pieces of office equipment may be provided with the catch members 162 and locking member 164.

Normally, the panels 22 are provided in 24 to 96 inch widths, but may be shorter. In one particularly useful embodiment, a 36-inch panel is provided between two other panels so that a shelving system may be set up at that location. In other words, the shelf brackets 154 are inserted through the gaps 38 and into the slots 72 at the interfaces between the 36-inch panel section and the outer panel sections. Thus, a shelving system of approximately 36 inches wide is formed. In another particularly useful embodiment, shelving brackets may be provided at distances of 12 to 96 inches from each other, and a central optional support may be formed in the panel or hung down from the mid-portion of the panel to provide a central support for a wide shelving system.

While the above description presents the preferred embodiment, the present invention may be embodied in other specific forms without departing from its spirit or essential characteristics. Also, the connector system may be used for permanent wall construction and for door or window frames. The system may be used to secure components, horizontal or vertical, to each other or stationary structures or apparatus.

We claim:

1. An edge connector to be attached to an edge of a first element and to be connected to a mating connector attached to an edge of a second element, said edge connector comprising:

a long planar web;

a flange joined to the web and extending forwardly from one side of the web; and a rail joined to the web spaced from the flange and extending forward from said web one side;

one of said flange and said rail having a protrusion, and the other of said flange and said rail having a cavity which is complementary to said protrusion, the protrusion extending in a first direction generally parallel to said web and the cavity being formed so as to open toward said first direction, one of said flange and said rail including a portion extending forwardly from said web within which portion at least one aperture is provided;

said edge connector being configured to mate with a mating connector which has a similar cross-section to that of said edge connector such that when the mating connector is inverted with respect to the edge connector, the protrusion on the edge connector will fit within the cavity of the mating connector and the protrusion on the mating connector will fit within the cavity of the edge connector, the protrusion on the mating connector extends in a second direction opposite said first direction and the cavity on the mating connector opens in said second direction, wherein the protrusions and cavities are engaged by moving said edge connector toward the mating connector and then moving said entire edge connector in said first direction with respect to the mating connector, the protrusion and mating cavity pairs preventing movement of said edge connector away from the mating connector while permitting movement of said entire edge connector in said second direction with respect to the mating connector thus permitting decoupling of said edge connector and the mating connector, the connectors capable of being locked together upon the insertion of structure through said aperture and between the connectors that prevents movement of said entire edge connector in said second direction with respect to the mating connector and holds the protrusions in the cavities.

2. An edge connector system comprising:

a first elongated channel member to be attached to an edge of a panel, said first channel member having a cross-section including a substantially planar web, a flange extending forwardly from one side of the web, and a rail directed forwardly from the same side of the web, the rail being spaced from the flange;

two or more slots formed in said flange and spaced along said first channel member;

a protrusion on a forward end of the flange directed outwardly away from the rail; and a cavity formed by said rail and directed inward toward the flange, said cavity having a cross-section which is complementary to the protrusion.

3. The system of claim 2, wherein with the first channel member, the flange extends forwardly farther from the web than does the rail.

4. The system of claim 2, wherein said slots extend along the length of the first channel member.

5. The system of claim 2, further comprising:

a second elongated channel member to be attached to an edge of a second panel, said second channel member having a cross-section similar to said first channel member including a substantially planar web, a flange extending forwardly from one side of the web, a rail directed forwardly from the same side of the web, the rail being spaced from the flange, a protrusion on a forward end of the flange directed outwardly away from the rail, and a cavity formed by said rail and directed inward toward the flange, said cavity having a cross-section which is complementary to the protrusion;

said first channel member being configured to mate with said second channel member inverted with respect to said first channel member, wherein said protrusion and said cavity of said first channel member mate with said cavity and protrusion, respectively, of the second channel member to couple the first and second channel members together upon insertion of a locking element between the flanges, said spaced slots being sized to receive the locking element, the locking element maintaining the protrusions in registration with the cavities; and elongate walls directed forwardly from said webs of each of said first and second channel members at an approximate mid-point thereof between said flange and said rail, said wall being offset from a center plane of said respective channel members so that when said second channel member is brought together with the first channel member said walls overlap, and wherein said locking element is inserted between the elongate wall of the first channel member and the flange of the second channel member or between the flange of the first channel member and the elongate wall of the second channel member.

6. The system of claim 5, wherein said flange includes a straight forwardly extending portion having said spaced slots for insertion of the locking element from an outer side of said flange.

7. The system of claim 6, wherein said slots are spaced a predetermined distance along said flange so that said locking element can be inserted in one of said slots and manipulated to provide structure between portions of said flange between said slots of said first channel member and said wall of said second channel member.

8. The system of claim 7, wherein said first channel member further comprises:

a pair of outer walls extending forwardly and rearwardly from both sides of said web, said outer walls running substantially the length of said first channel member, said rearwardly directed portions of said outer walls being adapted to grip an edge of a planar element, and said forwardly directed portions of said outer walls extending forwardly a predetermined distance to substantially obscure said flanges and rails of said first and second channel members yet have an elongated gap between said aligned outer walls of said first and second channel members for insertion of said locking element into one of said slots.

9. The system of claim 8, wherein said forwardly extending portions of said outer walls extend forwardly from said web approximately the same distance as said rail, said rail and said flange being positioned to define recesses with said outer walls for receiving fabric stretched across said planar element for concealing said outer walls.

10. The system of claim 9, wherein said flange includes a first portion adjacent said web extending forwardly and parallel to said forwardly directed portions of said outer wall, a second portion angled inward away from said recess defined thereby, and a third portion extending forwardly from said second portion and including said aperture and said mating protrusion.

11. The system of claim 2, wherein said first channel member further comprises a pair of elongate flanges extending rearwardly from said web, and having inwardly directed portions, said flanges defining a planar channel for receiving a corner bracket used to join two perpendicular channel members together.

12. The system of claim 2, wherein said first channel member is an extrusion.

13. A channel-like extrusion adapted to attach to an edge of a planar element, said extrusion including a portion having a modified E-shaped cross-section with a substantially planar web forming the vertical portion of an E-shape, a flange extending away from the web in a forward direction forming the lower arm of an E-shape, a rail spaced from said flange and extending away from the web to form an upper arm of the E-shape, the rail extending from the web a considerably shorter distance than the flange, and a wall extending away from the web and spaced between the flange and the rail to form the middle arm of the E-shape, said flange, said rail, and said wall all extending throughout the length of the extrusion, said flange and said rail each having mating structures configured such that when two lengths of the extrusions are cut and one length is inverted with respect to the other, the mating structure on the flanges will mate with the mating structures on the rails, said walls being situated such that they overlap when the extrusion lengths are in mating position.

14. The extrusion of claim 13, wherein said flange has a plurality of spaced slots adapted to receive a locking element which provides a force between a flange of one extrusion length and the wall of the other extrusion length so as to hold the mating structure in the mating position.

15. The extrusion of claim 13, including a panel abutment wall spaced from and extending generally parallel to said web, and a pair of spaced outer walls connected to said web and said abutment wall, thereby forming a closed space defined by the web, the abutment wall and the spaced outer walls, said outer walls including rearwardly extending portions which together with said panel abutment wall define a cavity for receiving an edge of a panel.

16. The extrusion of claim 15, wherein said outer walls include portions extending forwardly from said web that are respectively spaced from said rail and said flange to define a pair of fabric receiving recesses.

17. The extrusion of claim 13, including a panel abutment wall spaced from and oriented substantially parallel to said web and a pair of spaced outer walls joined to said web and said abutment wall thereby forming a closed space between the web, the abutment wall and the outer walls, said outer walls having portions which extend rearwardly beyond said panel abutment wall to define a cavity for receiving an edge of a panel, and a pair of spaced angled flanges joined to a rear side of said web, the angled flanges being arranged to define a channel for receiving one flat leg of a connector adapted to join a vertically oriented channel member to a horizontally oriented channel member positioned on a horizontal edge of a panel.

18. A connector system comprising:
 a first elongated channel having a cross section with a web, a flange extending away from one side of the web, and a rail spaced from the flange and extending away from said web on the same side of the web as the flange; and
 a second channel having a web, a flange, and a rail with a cross-section substantially the same as that of the first channel, said second channel being inverted with respect to the first channel so that the flange of one channel is juxtaposed with the rail of the second channel and the rail of the first channel is juxtaposed with the flange of the second channel, said channel flanges and rails having interlocking mating structures, which interlock by moving said first channel toward the second channel and then moving said entire first channel in a first direction generally parallel to said web with respect to the second channel, the interlocked mating structures preventing movement of said first channel away from said second channel, while permitting movement of said entire first channel in a second direction opposite said first direction with respect to said second channel thus permitting decoupling of said first channel and said second channel, said channels capable of being locked together upon insertion of a locking element into a space between the flanges of the interlocked channels to prevent movement of said entire first channel in said second direction with respect to said second channel.

19. A demountable panel system comprising:
 a pair of wall panels;
 a channel like connector member positioned on an edge of each of said panels, each of said channel members including a pair of spaced outer walls joined by a web extending generally perpendicular to the outer walls, and joined by a panel abutment wall extending generally parallel to and spaced rearwardly from said web, said abutment wall being joined to said outer walls at locations spaced from one end of each of the outer walls so that a panel receiving cavity is formed by the panel abutment wall and spaced ends of said outer walls, an edge of each of said panels being positioned in a panel receiving cavity;
 each of said channel members having a flange and a rail extending forwardly from the web with the flange and the rail being spaced from each other, the channel member attached to one panel being inverted with respect to the channel member attached to the other panel, and the flange and the rail being positioned on each of said channel members so that the panels can be moved into edge-to-edge locking engagement with each other, mating structure on the flanges of the channel members are positioned to be aligned with mating structure on the rail of the other channel member, wherein a gap is formed between said outer walls on at least one side of said engaged channel members; and
 a locking element positioned between said flanges to hold said channel members in interengaging relation, said locking element being positioned between said flanges by insertion in a direction generally parallel to said webs through said gap, said locking element being removable from between said flanges through said gap to enable said wall panels to be demounted.

20. The system of claim 19, including a barrier wall extending forwardly from the web on each of said channel members, with the barrier wall positioned between the flange and the rail on each of the channel members, said barrier walls being positioned so that when the flanges and the rails of the channel members are in locking position, the barrier walls are in overlapping relation, said locking element extends between the flange of one channel member and the barrier wall of the other channel member.

21. The system of claim 20, including a plurality of slots in the flange of each of said channel members with the slots being aligned in a row in spaced end-to-end relation, said locking element having a cam portion which fits within any of said slots and is rotatable to a position wherein the cam portion reacts against the flange in one of said channel members and the barrier wall on the other said channel member to hold said channel members in interengaged relation.

22. The system of claim 19, wherein said outer walls include fabric gripping end portions which extend forwardly from said web with one fabric gripping portion being spaced outwardly from the rail on each channel member to define a fabric receiving recess, and the other of said fabric gripping portions is spaced from the flange of each of said channel members to define a fabric receiving recess.

23. The system of claim 19, including a pair of corner plate receiving flanges positioned on a rear side of the web of each of said channel members, the corner plate flanges being spaced to define a channel for receiving a generally flat leg of an angled corner plate utilized to join a vertical channel member to a horizontal channel member positioned on a top or bottom edge of a panel.

24. The system of claim 19, wherein said channel members are oriented vertically on adjacent panel edges, and the system includes a pair of upper, horizontal channel members positioned on upper edges of the panels and joining the vertical channel members at intersecting corners, a leveling plate slidably mounted on an upper surface on each of the upper channel members, said plates being slidable forwardly to a position wherein a forward end of a leveling plate protrudes beyond the web of a vertical channel member and extends above the forward end of the barrier wall on the channel member of the adjacent panel so as to prevent the adjacent panel from extending above a level position with the adjacent panel, said leveling plate having a retracted position wherein its forward end no longer extends over the barrier plate of an adjacent panel so as not to interfere with the upward movement of the adjacent panel.

25. The system of claim 19, including a corner coupling member for joining two panels arranged perpendicularly to each other at a corner intersection, said corner coupling member including structure on one side adapted to mate with the flange and rail of a panel connecting member, and said corner coupling member having mating structure on an adjacent side having mating structure adapted to couple with mating structure on a vertically oriented channel member of a panel positioned perpendicular with respect to the channel member of an adjacent panel.

26. A demountable panel system comprising:
first and second rectangular panels each having a vertical channel member positioned on a vertical edge and a horizontal channel member positioned on a top edge, with the horizontal and vertical channel members on each panel intersecting to form an upper corner of the panel, said vertical channel members each having outer walls, a web extending between the outer walls, and a barrier wall extending forwardly from the web and positioned so that when the vertical channel members on the first and second panels are brought together, the barrier walls are in overlapping relation; and
a leveling plate slidably mounted on said horizontal channel member of said first panel and having a forward end which in an extended position protrudes above the barrier wall of the vertical channel member on the second panel so as to prevent the second panel from extending above a level position with respect to the first panel, said leveling plate having a retracted position wherein it no longer extends over the barrier wall of the second panel so as not to interfere with the upward movement of the second panel.

27. A corner connection between a horizontal channel member and a vertical channel member, said corner connection comprising:
a joint plane at an angle between said channel members formed by mitered ends of said members;
a horizontal planar web on said horizontal channel member and a vertical planar web on said vertical channel member, said webs meeting at a horizontal line in said joint plane;
a horizontal channel formed by opposed flanges on an inner side of said horizontal web relative to said corner connection;
a vertical channel formed by opposed flanges on an inner side of said vertical web; and
a corner bracket having a horizontal planar leg, a vertical planar leg, and an apex, said horizontal leg sized to fit within said horizontal channel a certain distance and said vertical leg sized to fit within said vertical channel a certain distance, said corner bracket being sized to fit into the respective horizontal and vertical channels until the apex is in the joint plane, wherein said bracket legs have portions bent out of their respective planes to create frictional interference with said flanges.

28. In an edge locking system, a locking key for insertion into a slot to bias apart two spaced walls, one of said walls including said slot which is sized to receive the key, said key comprising:
a main body having a generally flat configuration with an irregular edge shape including a central main body portion having a concave side and an opposite convex side;
a generally rectangular cam having two opposite ends joined by two longer sides;
a neck joining one of said longer cam sides to one end of said central main body portion between said concave and convex sides, wherein a neck dimension across said neck is less than a cam dimension between the cam ends, and a side dimension between said concave and convex sides is more than said neck dimension but is less than the cam dimension; and
a lever on the end of said central main body portion opposite from said cam and extending generally away from said cam and generally perpendicular to the cam dimension.

29. The system of claim 28, wherein said locking key includes an edge shoulder between said convex side and said lever.

30. An edge connector system comprising:
an elongated first channel member to be attached to an edge of a first panel, said first channel member having:
a cross-section including a substantially planar web,
a flange extending forwardly from one side of the web,
a rail directed forwardly from said one side of the web, the rail being spaced from the flange,
a protrusion on a forward end of the flange directed outwardly away from the rail,
a cavity formed by said rail and directed inward toward the flange, said cavity having a cross-section which is complementary to the protrusion and,
an elongate wall directed forwardly from said web at an approximate midpoint thereof between said flange and said rail, said wall being offset from a center plane of said channel member;
an elongated second channel member to be attached to an edge of a second panel, said second channel member having:
a cross-section including a substantially planar web,
a flange extending forwardly from one side of the web,
a rail directed forwardly from said one side of the web, the rail being spaced from the flange,
a protrusion on a forward end of the flange directed outwardly away from the rail,
a cavity formed by said rail and directed inward toward the flange, said cavity having a cross-section which is complementary to the protrusion, and an elongate wall directed forwardly from said web at an approximate midpoint thereof between said flange and said rail, said wall being offset from a center plane of said channel member; and a locking element;

said first channel member being configured to mate with said second channel member inverted with respect to said first channel member so that when said second member is brought together with the first member said walls overlap and said protrusion and said cavity of said first channel member mate with the cavity and protrusion of the second channel member, respectively, and said channel members are coupled together upon insertion of said locking element between the flanges to hold the protrusions in the cavities.

31. The system of claim 30, wherein said flange includes a straight forwardly extending portion having at least one aperture for insertion of the locking element from an outer side of said flange.

32. The system of claim 31, wherein said locking element is inserted between the elongate wall of the first channel member and the flange of the second channel member or between the flange of the first channel member and the elongate wall of the second channel member, and wherein each of said flanges includes a plurality of slots spaced a predetermined distance so that said locking element can be inserted in one of said slots and manipulated to provide structure between portions of the flange between said slots of said first channel member and the elongate wall of said second channel member.

33. The system of claim 31, wherein each of said first and second channel members further comprises:

a pair of outer walls extending forwardly and rearwardly from both sides of said web, said outer walls running substantially the length of said member, said rearwardly directed portions of said outer walls being adapted to grip an edge of a planar element, and said forwardly directed portions of said outer walls extending forwardly a predetermined distance to substantially obscure said mating structure of said first and second channel members yet leave an elongated gap between said aligned outer walls of said first and second channel members for insertion of said locking element between the flanges.

34. The system of claim 33, wherein said forwardly directed portions of said outer walls extend forwardly from said web approximately the same distance as said rail, said rail and said flange being positioned to define recesses with said outer walls for receiving fabric stretched across said planar element for concealing said outer walls.

35. The system of claim 34, wherein said flange includes a first portion adjacent said web extending forwardly and parallel to said forwardly directed portion of said outer wall, a second portion angled inward away from the recess formed by said flange and one of said outer walls; and a third portion extending forwardly from said second portion and including said protrusion and a plurality of apertures through which said locking element may be inserted between said flanges.

36. A demountable panel system comprising:

a pair of wall panels;

a channel-like connector member positioned on adjacent vertical edges of each of said panels, each of said connector members including a pair of spaced outer walls joined by a web extending generally perpendicular to the outer walls, and joined by a panel abutment wall extending generally parallel to and spaced rearwardly from said web, said abutment wall being joined to said outer walls at locations spaced from one end of each of the outer walls so that a panel receiving cavity is formed by the panel abutment wall and spaced ends of said outer walls, an edge of each of said panels being positioned in a panel receiving cavity;

each of said connector members having a flange and a rail extending forwardly from the web with the flange and the rail being spaced from each other, the connector member attached to one wall panel being inverted with respect to the connector member attached to the other wall panel, and the flange and the rail being positioned on each of said connector members so that the wall panels can be moved into edge-to-edge locking engagement with each other, mating structure on the flanges of the connector members are positioned to be aligned with mating structure on the rail of the other connector member;

a locking element positioned between said flanges to hold said connector members in interengaging relation;

a pair of upper, horizontal connector members positioned on upper edges of the panels and joining the vertical connector members at intersecting corners; and a leveling plate slidably mounted on an upper surface of the upper connector members of the one panel, said plate being slidable forwardly to a position wherein a forward end protrudes above the barrier wall of the connector member on the other wall panel so as to prevent the other wall panel from extending above a level position with respect to the one wall panel, said leveling plate having a retracted position wherein its forward end no longer extends over the barrier plate of the other wall panel so as not to interfere with the upward movement of the other wall panel.

* * * * *